United States Patent Office 3,644,642
Patented Feb. 22, 1972

3,644,642
UREA-CONTAINING RUMINANT FEED
Benjamin B. Wilson and Joseph S. Wortham, Colonial Heights, Va., assignors to Allied Chemical Corporation, New York, N.Y.
No Drawing. Filed Apr. 14, 1969, Ser. No. 816,107
Int. Cl. A61k *27/00*
U.S. Cl. 424—319                                                        6 Claims

ABSTRACT OF THE DISCLOSURE

Combination of a hydroxamic acid and ethylenediaminetetraacetic acid (EDTA) in a urea-containing ruminant feed inhibits urease enzymes in the rumen from converting the urea to ammonia. The effectiveness of the hydroxamic acid in inhibiting and controlling the action of the enzymes is enhanced by incorporation therewith of the EDTA.

BACKGROUND OF THE INVENTION

This invention relates to ruminant feed compositions containing urea as a supplementary source of nonprotein nitrogen, and in particular to urea-containing feed compositions having a urease enzyme inhibitor incorporated therein.

Ruminant animals, including cattle and sheep, have a complex stomach of several compartments, the first of which is known as the rumen. It is generally believed that nitrogen-containing material fed to the animal is converted into protein by the complex microorganisms of the rumen, then digested, assimilated, and converted to organismal protein by the host animal. The nitrogen-containing material may be a protein or a non-protein nitrogen source, such as urea. Urea is attractive as a nitrogen-containing supplement in feeding ruminants because it represents a concentrated and low-cost source of nitrogen.

For this reason, it has been common practice to feed urea to ruminants for the purpose of supplementing natural protein in feeds such as hay and grains. Both urea and natural protein are broken down by the complex microorganisms in the rumen to ammonia and carbon fragments, and thereafter reconstituted, together with cellulose degradation products, to form amino acids which build protein subsequently used by the host animal. The cellulose degradation process provides energy for the amino acid reconstitution process.

It appears, however, that urea is not efficiently used by the host animal because it is converted to ammonia in the rumen at a very rapid rate, generally in excess of the rate at which it can be converted by the microorganisms. This is particularly true as greater proportions of the nitrogen requirements of the animal are supplied in the form of urea. This problem is discussed in Morrison, Feeds and Feeding 22d ed. (1957), pp. 81–82. Thus, if ammonia becomes available before the cellulose has fermented, i.e., before energy is available to convert the ammonia in amino acids, the ammonia may be lost in the animal excreta or a condition of toxicity may develop.

Accordingly, there has been a continuing interest in achieving the objective of providing a relatively high proportion of urea-containing feed supplement in ruminant feed in a form which undergoes conversion to ammonia in the rumen more slowly over an extended period. In other words, it is desirable to regulate the rate of conversion of the ingested urea to ammonia in the rumen in order to achieve optimal concentrations of ammonia over a prolonged period. In this way, the ammonia would be utilized most efficiently in protein production and the danger of toxicity would be obviated.

Various methods have been attempted heretofore to regulate the rate of conversion of urea to ammonia in the rumen. For example, U.S. Pat. 3,180,735 discloses the use of a ddition complexes of urea and a nutrient mineral acid or salt thereof as a means of slowing the conversion. Also, coating urea with water-resistant material, e.g., wax, as disclosed in U.S. Pat. 2,560,830, has been used. Such methods are economically disadvantageous, however, as they require additional treatment of the urea, and they have not found widespread use.

In addition, attempts have been made to inhibit the activity of urease enzymes in the rumen, which are responsible for the conversion. However, it is essential that any inhibitor incorporated in the feed for this purpose does not affect the microorganisms in the rumen which must be maintained alive and functioning, i.e., the inhibitor must effectively inhibit the urease enzymes at a dosage which is harmless to the animal. Among the various urease enzyme inhibitors employed for this purpose is acetohydroxamic acid. Baintner, Chemical Abstracts, 65, 5770c (1966), discloses the administration to ruminants of up to about 0.44 gram of this compound per kilogram of body weight in order to competitively inhibit the enzyme. However, there remains a great need to develop improved methods of inhibiting the enzyme in a more efficient manner, utilizing readily available inhibitors which are effective at low concentrations.

SUMMARY OF THE INVENTION

It has now been found that in ruminant feed compositions containing cellulosic material, urea and a hydroxamic acid urease enzyme inhibitor, incorporating therein, based on the weight of urea, about 0.1–10% of ethylenediamine tetraacetic acid (EDTA) further inhibits the conversion of urea to ammonia in the rumen without substantially impairing cellulose digestion.

DETAILED DESCRIPTION OF THE INVENTION

According to the instant invention, the inhibiting effect of a hydroxamic acid on the activity of urease enzymes is enhanced by EDTA. The urea in a ruminant feed is thus converted to ammonia more slowly over an extended period of time than is achieved by the sole use of a hydroxamic acid. There is evidence that this enhancement by EDTA is actually synergistic, with the level of inhibition being greater after about six hours then the sum inhibition due to the hydroxamic acid and EDTA when used separately. Also, the EDTA improves cellulose digestion.

Hydroxamic acids which are useful as urease enzyme inhibitors in the instant invention contain about 2–18 carbon atoms and include the following: acetohydroxamic acid, oxalodihydroxamic acid, cinnamohydroxamic acid, and the like. Preferred hydroxamic acids are oxalodihydroxamic acid and, more preferably, acetohydroxamic acid. The hydroxamic acid can be employed either as the free acid or the alkali metal salt or mixtures thereof.

The amount of hydroxamic acid employed in the feed compositions of this invention is preferably about 1–20% of the weight of urea in the feed. However, levels outside this range might be desirably on occasion, depending upon the level of inhibition desired, the amount of EDTA used and the specific hydroxamic acid being used.

EDTA. either as the free acid or an alkali metal salt or mixture thereof, is incorporated in the feed composition at a level of about 0.1–1% of the weight of urea in the composition.

The hydroxamic acid and EDTA are preferably mixed with the urea or coated thereupon before the urea is mixed with the animal feed. For best control of the ammonia concentration in the rumen, the urea is added to the feed at a rate sufficient to provide about 0.1–0.3 gram of urea per day per kilogram of body weight of the ruminant. For a urea level within this range, the instant compositions will administer the hydroxamic acid at a rate within the range of about 0.001–0.06 gram per day per kilogram of body weight, and will administer the EDTA at a rate within the range of about 0.0001–0.03 gram per day per kilogram of body weight.

The ruminant feed compositions to which the hydroxamic acid and EDTA are added generally contain nutritionally balanced quantities of carbohydrates, fiber and protein, with urea added thereto as a supplementary source of nitrogen. The urea-hydroxamic acid-EDTA mixture can be added without dilution to the ruminant feed or it can be mixed with diluents such as vermiculite, finely divided materials like ground hay, dehydrated alfalfa meal, etc.

The following examples are provided to illustrate the instant invention more fully. They are provided for illustrative purposes only and are not to be construed as limiting the invention, which is defined by the appended claims. It is recognized that measurement of variation of ammonia level with time in an artificial rumen provides a good indication of expectation in a live rumen. However, it is also necessary to know that additives do not poison the cellulose digestion, which provides an indication of the state of the microbial population. If cellulose is digested, the system is functioning in all respects, such as synthesis of proteins for normal metabolic processes and utilization of available energy. For this reason, cellulose digestion data are reported in the following examples.

EXAMPLE I

Since many difficulties are encountered in vivo studies of the use of urea in ruminants, the effect of adding a urease inhibitor and EDTA with the urea was studied by in vitro methods.

An artificial rumen was prepared by collecting 3 liters of rumen contents from a fistulated steer and removing solids therefrom by straining through six layers of cheesecloth. The straining gave 1.5 liters of rumen liquor which was diluted to 3 liters with a prepared medium, previously saturated with carbon dioxide, of the following composition:

| Component: | Grams/1.5 liters |
| --- | --- |
| $Na_2HPO_4 \cdot 7H_2O$ | 0.9 |
| $KH_2PO_4$ | 0.45 |
| $NaHCO_3$ | 2.62 |
| $KCl$ | 3.0 |
| $NaCl$ | 3.0 |
| $MgSO_4$ | 0.112 |
| $FeSO_4$ | 0.0562 |
| $CaCl_2$ | 0.412 |
| $CuSO_4 \cdot 5H_2O$ | 0.002 |
| $MnSO_4 \cdot 5H_2O$ | 0.0003 |
| $CaCl_2 \cdot 6H_2O$ | 0.002 |

The pH of the liquor was then adjusted to 6.8 with sodium carbonate and was then heated to 39° C.

Two hundred milliliters of the resulting suspension was added to fermentation flasks containing varied amounts of EDTA and 1 milligram of urea and 0.1 milligram of acetohydroxamic acid per milliliter of suspension. Duplicate determinations were used to determine ammonia content of the cell suspension after 2, 4 and 6 hours of fermentation.

Cellulose digestion by rumen bacteria was determined by using the same rumen liquor and prepared medium as described above, with 25 milliliter aliquots being added to 50 milliliter tubes containing 0.3 gram of cellulose. The tubes were connected to a carbon dioxide source and incubated for 23 hours in a constant temperature bath at 39° C. with carbon dioxide bubbling through to maintain anaerobic conditions and to keep the cellulose substrate in suspension. Blank determinations were used as a basic value for determining the amount of cellulose digested.

| Time | Millimols $NH_3$/100 ml. of rumen fluid [1] | | | | Cellulose digestion after 24 hrs., percent |
| --- | --- | --- | --- | --- | --- |
| | 0 hrs. | 2 hrs. | 4 hrs. | 6 hrs. | |
| Urea with 10% acetohydroxamic acid and— | | | | | |
| 0.8% EDTA | 0.43 | 0.60 (21%) | 0.95 (32%) | 1.44 (46%) | 52 |
| 0.4% EDTA | 0.43 | 0.67 (23%) | 1.01 (35%) | 1.44 (46%) | 48 |
| Urea with 10% acetohydroxamic acid | 0.43 | 0.90 (31%) | 1.20 (42%) | 2.07 (67%) | 48 |
| Urea with 0.8 EDTA | 0.43 | 2.71 (92%) | 2.66 (91%) | 2.76 (88%) | 56 |
| Urea | 0.43 | 2.98 (100%) | 2.93 (100%) | 3.11 (100%) | 60 |

[1] Corresponding percent urea hydrolysis.

EXAMPLE II

The procedure of Example I was repeated wherein oxalodihydroxamic acid was used, instead of acetohydroxamic acid, in combination with EDTA. The inhibition of urea hydrolysis by oxalodihydroxamic acid was enhanced by the addition of 0.8% EDTA.

EXAMPLE III

A feed composition suitable for beef cattle was prepared with the following composition:

| Ingredient: | Part by weight |
| --- | --- |
| Corn (ground shelled) | 14.60 |
| Corn silage | 19.53 |
| Soybean oil meal | 0.50 |
| Limestone | 0.20 |
| Urea with 8% acetohydroxamic acid and 0.8% EDTA | 0.10 |
| Trace mineral salts | 0.50 |

When this feed composition is fed on a free choice basis to steers averaging 500–1000 pounds in weight, weight gains of about 2 pounds per day are obtained.

We claim:

1. In the method of improving the utilization by ruminants of urea in a urea-containing cellulosic feed composition by incorporating therein a hydroxamic acid urease enzyme inhibitor, said hydroxamic acid being incorporated in the amount of 10% by weight of the urea in the said feed composition, the improvement which comprises additionally incorporating therein about 0.4% by weight of ethylene-diaminetetraacetic acid, thereby enhancing the action of said inhibitor.

2. The method of claim 1 wherein said urease enzyme inhibitor is acetohydroxamic acid.

3. In the method of improving the utilization by ruminants of urea in a urea-containing cellulosic feed composition by incorporating therein a hydroxamic acid urease enzyme inhibitor, said hydroxamic acid being incorporated in the amount of 10% by weight of the urea in the said feed composition, the improvement which comprises additionally incorporating therein 0.8% by weight of ethylene-diaminetetraacetic acid, thereby enhancing the action of said inhibitor.

4. The method of claim 3 wherein said urease enzyme inhibitor is acetohydroxamic acid.

5. In the method of improving the utilization by ruminants of urea in a urea-containing cellulosic feed composition by incorporating therein a hydroxamic acid urease enzyme inhibitor, said hydroxamic acid being incorporated in the amount of 8% by weight of the urea in the said feed composition, the improvement which comprises additionally incorporating therein 0.8% by weight of ethylene-diaminetetraacetic acid, thereby enhancing the action of said inhibitor.

6. The method of claim 5 wherein said urease enzyme inhibitor is acetohydroxamic acid.

References Cited

Chemical Abstracts (1964), 16369.
Chemical Abstracts (1966), 65 5770.

ALBERT T. MEYERS, Primary Examiner

F. E. WADDELL, Assistant Examiner

U.S. Cl. X.R.

424—315. 322